Dec. 3, 1968 H. J. JEZEK 3,413,784
COTTON STRIPPING APPARATUS
Filed April 28, 1966 2 Sheets-Sheet 1
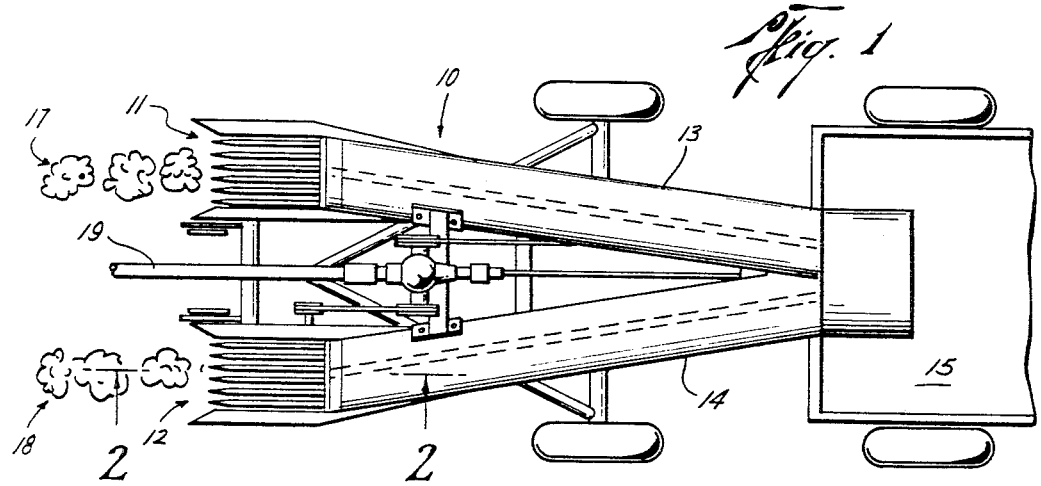
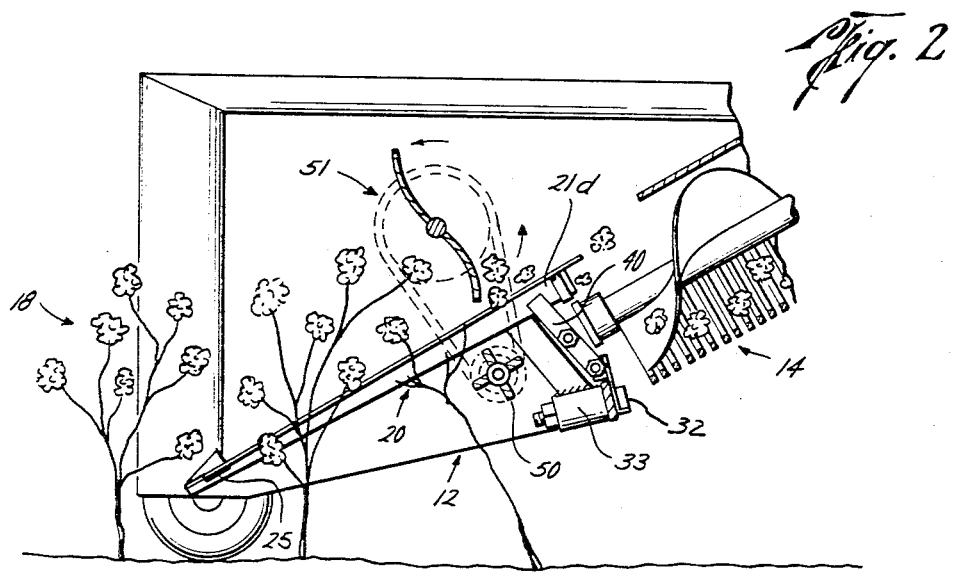
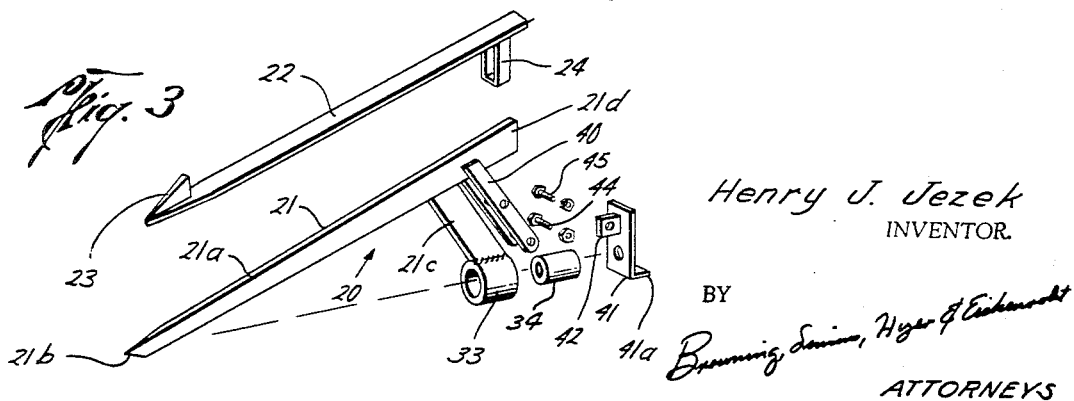
Henry J. Jezek
INVENTOR.
BY
ATTORNEYS

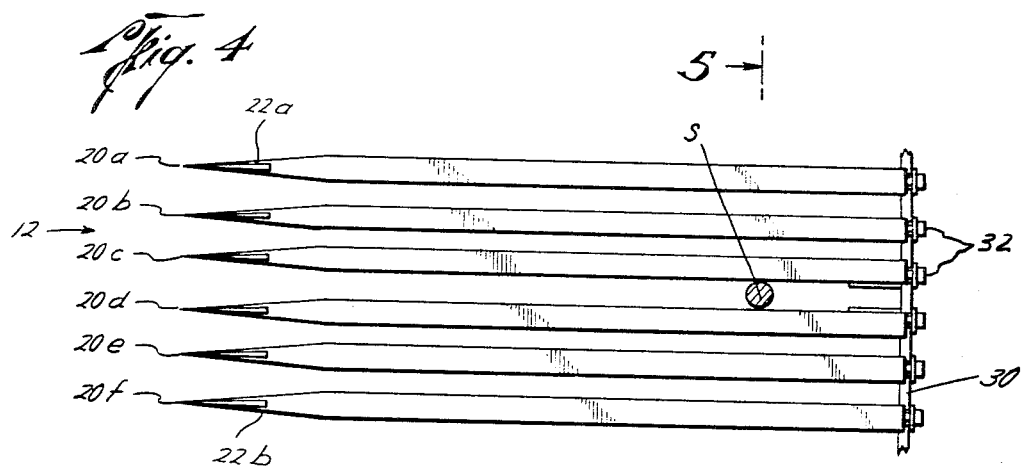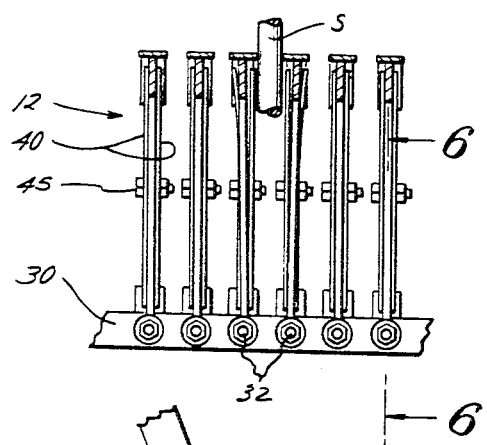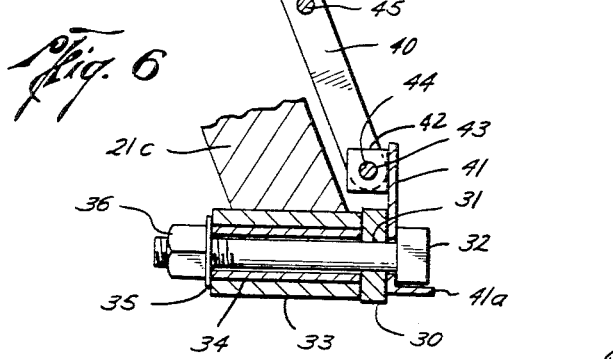

United States Patent Office 3,413,784
Patented Dec. 3, 1968

3,413,784
COTTON STRIPPING APPARATUS
Henry J. Jezek, 1204 E. Downsave,
Temple, Tex. 76501
Filed Apr. 28, 1966, Ser. No. 546,061
7 Claims. (Cl. 56—34)

This invention relates to cotton strippers generally, and in particular, to the assembly of fingers that is moved through the cotton to comb or strip the bolls therefrom.

In cotton strippers of the type to which this invention relates, a plurality of fingers are assembled in generally parallel, spaced, relationship, much like the teeth of a comb. The fingers are moved through the cotton to strip or comb the bolls therefrom as the cotton stalks move through the spaces between the fingers. Preferably, the fingers are spaced apart such that the fingers will strip the bolls efficiently, but not such that the stalks will jam between the fingers and be pulled from the ground. When the latter occurs, the fingers between which the stalks are located cannot efficiently strip cotton again until the jammed stalks have been removed. Stopping to remove these jammed stalks is time consuming and expensive.

Thus, it is very important to have the proper spacing between the fingers for the particular size and density of cotton stalks passing between the fingers. The desired spacing changes, however, for the size and density of the cotton stalks change from field to field and between different areas of the same field.

Therefore, it is an object of this invention to provide cotton stripping apparatus, having fingers for combing the bolls from the cotton, in which the fingers can automatically adjust the spacing therebetween to accommodate changing harvesting conditions.

It is another object of this invention to provide cotton stripping apparatus, having spaced fingers for stripping the bolls from the cotton, in which each finger can move laterally relative to and independently of the other fingers to accommodate different sizes and numbers of cotton stalks passing between the fingers.

It is yet another object of this invention to provide cotton stripping apparatus having a plurality of cotton stripping fingers in which each finger is held against lateral movement by its own separate spring system so that each finger moves independently of the other fingers to accommodate different size cotton stalks and so that the spring force exerted on each finger holding it against lateral movement can be independently and separately adjusted for each finger.

It is a further object of this invention to provide such cotton stripping apparatus in which each finger and its associated spring system is mounted on the vehicle that moves it through the cotton so that the spacing between two or more fingers can be adjusted without changing the spring force holding each finger against lateral movement.

These and other objects, advantages, and features of the invention will be apparent to those skilled in the art from a consideration of this specification and attached drawings.

The preferred embodiment of the invention will now be described in detail in connection with the attached drawings in which;

FIGURE 1 is a top plan view of a cotton stripper designed to strip two rows of cotton at a time;

FIGURE 2 is a vertical cross sectional view along line 2—2 of FIGURE 1 showing how the cotton stripping fingers are mounted on the machine in accordance with this invention;

FIGURE 3 is an exploded isometric view of one of the fingers and its mounting apparatus;

FIGURE 4 is a top plan view of a plurality of the cotton stripping fingers of FIGURE 4 mounted in spaced parallel, relationship in accordance with this invention with two of the fingers moved apart by a cotton stalk passing between them;

FIGURE 5 is a cross sectional view taken along line 5—5 of FIGURE 4; and

FIGURE 6 is a vertical cross sectional view, on an enlarged scale, taken along line 6—6 of FIGURE 5.

The cotton stripper of FIGURE 1 has two cotton stripping finger assemblies 11 and 12 mounted on vehicle 10 for stripping the bolls from two parallel rows of cotton. Bin or hopper 15 is mounted on wheels and pulled along after the cotton stripper for collecting the bolls stripped from the cotton. Screw conveyors 13 and 14 convey the bolls to the collecting bin after they have been stripped from the cotton. The cotton stripper shown is designed to be pulled by a tractor (not shown) along cotton rows 17 and 18. The stripper is powered through power take-off shaft 19, which is drivent by the tractor. The power take-off shaft drives the screw conveyors, an air blower (not shown) that are used to blow the bolls into hopper 15 from the end of the conveyors, and other items that will be described below.

Cotton stripping finger assemblies 11 and 12 are identical so only one will be described in detail. Each assembly includes a plurality of cotton stripping fingers 20. Each finger, as shown in FIGURE 3, includes finger body 21 and finger stripping plate 22. Finger body 21 is generally L-shaped. It has a first stripping leg 21a for supporting stripping plate 22 and a second mounting leg 21c. In the embodiment shown, each leg is made from flat plate. Preferably, leg 21a is made from a relatively thin flat plate of a resilient material, such as steel, so that it will have considerable flexibility. Also, preferably, this leg is elongated as compered to leg 21c. To add to the flexibility of this leg it diminishes in width toward its outer free end 21b. Adjacent its free end it diminishes in thickness to provide a relatively sharp edge.

Stripping plate 22 is mounted on the top of leg 21a of the finger body. It extends from the outer free end of the stripping leg to slightly beyond the rear end of portion 21d of the leg. Portion 21d extends rearwardly beyond the juncture between the stripping leg and the mounting leg in the embodiment shown. The rear of the stripping plate is connected to the leg by strap 24 that is attached to the rear end of plate 22 and encircles rear portion 21d of the stripping leg. The forward end of the plate is attached to the finger body in any convenient manner as by weld 25 show in FIGURE 2.

The stripping plate is of uniform width except at its forward end where it tapers to a point directly above the pointed free end of the stripping leg. Mounted on the pointed end of the plate is lug 23. The lug is to help hold any stripped cotton bolls that may fall down the fingers until the next stalk enters and carries the bolls upwardly toward the screw conveyors. The holding ability of the lugs is increased by mounting them on the stripping plate rather than on the stripping leg of the finger body. With this arrangement, areas 22a and 22b of the stripper plate on each side of the lug can help hold the bolls from falling to the ground.

The fingers are mounted on the vehicle for moving through the cotton. Finger assembly 12 is shown in FIGURES 4 and 5 and includes individual fingers 20a–20f. Means are provided to mount the fingers in spaced, side by side, generally parallel, relationship with the first or stripping leg of each finger, and the stripping plate mounted thereon, inclined downwardly in the direction of travel of the vehicle. The mounting means also mounts the fingers to pivot around an axis extending generally in the direction of travel of the vehicle.

In the embodiment shown, mounting bar 30 is mounted on vehicle 10 transverse to the direction of travel of the vehicle and generally parallel to the ground. Each finger is mounted on the mounting bar as shown in FIGURES 2 and 6. The bar is provided with a plurality of spaced mounting holes 31 through which mounting bolts 32 extend. Each finger is provided with a mounting hub 33 which is connected to the outer end of mounting leg 21c of the finger body. The hub is provided with an opening large enough to receive mounting bolt 32 and sleeve 34 through which the bolt extends. Washer 35 and nut 36 complete the assembly. Preferably, sleeve 34 is slightly longer than hub 33 so that nut 36 can be tightened on the bolt to pull the washer against the sleeve and the sleeve tightly against mounting bar 30 without interfering with the free rotation of the hub on the sleeve. A grease fitting (not shown) is usually mounted on the hub to supply grease between it and the sleeve.

Thus, as shown in FIGURES 4 and 5, the fingers are mounted in a row along mounting bar 30 for pivotal movement around axes extending generally in the direction of travel of the vehicle. These axes of rotation, of course, are the longitudinal axes of mounting bolts 32.

Means are provided to yieldingly hold each finger separately against pivotal movement around its axis of rotation to allow each finger to pivot away from an adjacent finger independently of the other fingers, as required to accommodate cotton plants passing between the fingers. In the embodiment shown, spring members 40 are located on opposite sides of each finger to yieldingly hold the finger against such rotation. The spring members shown are flat plates made of resilient material, such as spring steel. The spring members associated with each finger have one end fixed to the mounting means and the other end in engagement with rearwardly extending portion 21d of the finger body. The spring members are connected to the mounting means through L-shaped bracket 41 and tab 42, which is connected to the bracket. The spring members are mounted on tab 42 by bolt 44, which extends through hole 43 therein. By locating bolt hole 43 in the tab such that the top surface of the spring members engage the side of the bracket, as shown in FIGURE 6, the spring members can be held in position to engage the fingers at the desired location.

With this arrangement, as each finger moves laterally its movement is resisted by the spring member on the side toward which it moves. If desired, both spring members can be caused to exert a holding force on the finger by connecting them together so that the movement of one will be transmitted to the other. In the embodiment shown, each pair of spring members are connected by bolt 45 located intermediate their ends. By tightening the bolt the spring force resisting movement of each finger can be increased. By loosening the bolt this force can be reduced.

It may be desirable on occasions, to change the position of the fingers relative to the axes around which they are mounted to rotate to thereby adjust the spacing between the fingers. In accordance with this invention, this can be done without changing the relative position of each finger and its associated spring means. Thus, in the embodiment shown, spring members 40 are mounted on L-shaped bracket 41. The distance between leg 41a of this bracket and the opening in the bracket through which mounting bolt 32 extends is designed so that one of the flat sides of the head of bolt 32 is close enough to leg 41a to prevent the bracket from rotating around the bolt. Thus, by simply loosening nut 36, rotating the finger, along with bracket 41 and bolt head 32, to the desired position and retightening nut 36, the position of the finger can be adjusted on its axis of rotation without changing its position relative to its spring assembly.

FIGURES 4 and 5 illustrate how the fingers rotate around their axes and move apart to accommodate large cotton stalks. As shown stalk S is moving between fingers 20c and 20d. Note that the movement of each of these fingers is independent of the others.

FIGURE 2 shows cotton stripping finger assembly 12 combing the bolls from cotton row 18. Mounted below the fingers is cleaner rotor 50, which rotates in the counterclockwise direction as viewed in FIGURE 2. It is the purpose of the cleaner rotor to help pull the cotton stalks downwardly from between the fingers as they approach the end of their travel therebetween, to pull the last bolls from the stalks and to reduce the tendency of the fingers to pull the stalks out of the ground. Mounted above the fingers is feeder rotor 51. It also rotates in a counterclockwise direction as viewed in FIGURE 2. This rotor is positioned to help move the cotton bolls, after they have been pulled from the stalks, into screw conveyor 14 for movement to hopper 15. Rotors 50 and 51 are driven by the tractor through appropriate driven mechanisms.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for mounting on a vehicle for movement through cotton plants to strip the bolls therefrom, comprising, a plurality of elongated stripping fingers, means for mounting the fingers on a vehicle to extend in side-by-side spaced relationship generally in the direction of travel of the vehicle, each finger being mounted to pivot laterally around an axis extending generally in the direction of travel of the vehicle, and means yieldingly holding each finger separately against pivotal movement around said axis to allow each finger to pivot away from an adjacent finger independently of the other fingers as required to accommodate cotton plants passing between the fingers.

2. The apparatus of claim 1 in which said fingers are L-shaped having a first leg inclined downwardly in the direction of travel of the vehicle and a second leg that is pivotally mounted on the vehicle to pivot around an axis extending generally in the direction of travel of the vehicle.

3. The apparatus of claim 2 in which said holding means includes spring members located on opposite sides of each finger with at least one end of each member fixed to one of the mounting means and the fingers whereby pivotal movement of each fingers will be resisted by at least one of its associated spring members.

4. The apparatus of claim 3 in which said spring members are flat plates of resilient material.

5. The apparatus of claim 4 in which the said flat plates on each side of a finger are connected together intermediate their ends by an adjustable member to allow the pivotal movement of a finger in either direction to be yieldingly resisted by flat plates on each side thereof.

6. The apparatus of claim 3 in which said finger mounting means includes means allowing each finger to be moved on its pivotal axis to adjust the space between two or more of the fingers without changing the relative position of the finger and its associated spring members.

7. The apparatus of claim 2 in which the first leg includes a flat stripping plate that tapers to a point adjacent its forward end and a ball retaining lug mounted on the plate and which tapers to a point above the pointed end of the plate, said lug being considerably more narrow than the plate is wide whereby there are areas of the plate on each side of the lug to help hold stripped cotton bolls.

References Cited
UNITED STATES PATENTS

| | | | |
|---|---|---|---|
| 1,368,014 | 2/1921 | Bauert et al. | 56—27 |
| 2,616,236 | 11/1952 | Hartley | 56—34 |
| 2,934,877 | 5/1960 | Fowler | 56—34 |
| 3,067,561 | 12/1962 | Jezek | 56—34 |

RUSSELL R. KINSEY, *Primary Examiner.*